United States Patent [19]
Young

[11] Patent Number: 5,934,589
[45] Date of Patent: Aug. 10, 1999

[54] FISHING REEL MAIN SHAFT ISOLATION SUPPORT SYSTEM

[75] Inventor: John Newton Young, Fairfax, Calif.

[73] Assignee: Charles C. Worth Corporation, San Rafael, Calif.

[21] Appl. No.: 08/991,807

[22] Filed: Dec. 16, 1997

Related U.S. Application Data

[60] Provisional application No. 60/033,012, Dec. 16, 1996.

[51] Int. Cl.$^6$ .................................................. A01K 89/00
[52] U.S. Cl. ........................... 242/321; 242/249; 242/311
[58] Field of Search .................................... 242/321, 322, 242/224, 242, 249, 310, 311

[56] References Cited

U.S. PATENT DOCUMENTS

| | | | |
|---|---|---|---|
| 4,416,428 | 11/1983 | Noda | 242/249 X |
| 4,427,162 | 1/1984 | Noda | 242/249 X |
| 4,650,161 | 3/1987 | Kaneko | 242/224 |
| 4,773,611 | 9/1988 | Kaneko | 242/322 X |
| 4,938,433 | 7/1990 | Toda | 242/224 X |
| 5,042,741 | 8/1991 | Aota | 242/224 X |
| 5,098,032 | 3/1992 | Toda | 242/224 X |
| 5,211,355 | 5/1993 | Furomoto | 242/321 X |
| 5,362,012 | 11/1994 | Ban | 242/321 |
| 5,697,567 | 12/1997 | Sonenvald | 242/322 |
| 5,855,330 | 1/1999 | Kobayashi | 242/321 X |

*Primary Examiner*—Donald P. Walsh
*Assistant Examiner*—Emmanuel M. Marcelo
*Attorney, Agent, or Firm*—Law Office of Virginia H. Meyer; Virginia H. Meyer, Esq.; Mark J. Spolyar, Esq.

[57] ABSTRACT

An improved fishing reel with a main shaft support system that holds the main shaft in reduced frictional isolation from the pinion. More specifically, a radial support members to hold the main shaft concentric to the pinion and frictionally isolated therefrom. This system thus reduces the friction between a main shaft and a pinion to yield a more efficient fishing reel. A method is further provided to retrofit conventional fishing reels with the isolation support system of the present invention.

23 Claims, 5 Drawing Sheets

FISHING REEL MAIN SHAFT ISOLATION SUPPORT SYSTEM

RELATED APPLICATION

The application claims the benefit of U.S. Provisional Patent Application No. 60/033,012 filed Dec. 16, 1996.

FIELD OF THE INVENTION

The present invention relates to a fishing reel that winds line on a spool. More particularly, the present invention relates to a fishing reel having an isolated support reciprocating system that reduces the friction between the reciprocating components.

BACKGROUND OF THE INVENTION

The use of reciprocating mechanisms in fishing reels to effect controlled winding of line on associated spools is known. Common reciprocating mechanisms include a main shaft that oscillates axially within a pinion as the pinion rotates a rotor attached thereto. In many prior art reciprocating mechanisms, a substantial amount of friction develops between the oscillating main shaft and the rotating pinion when the reel is operated to retrieve line. This friction increases as larger resistance is applied to the fishing line being retrieved, and affects the ease with which the fisherman can retrieve the line; thus, much effort is wasted overcoming the main shaft/pinion friction that would be more desirably applied to retrieving the line and hauling in the fish.

To improve the efficiency of fishing reels, and to make it easier for fishermen to retrieve line, it is an object of the present invention to reduce the friction between the oscillating main shaft and the rotating pinion.

SUMMARY OF THE INVENTION

The present invention provides a fishing reel main shaft support system that holds the main shaft in reduced frictional contact with the pinion. More specifically, the present invention provides support members radially aligned to the rotating pinion to hold the main shaft concentric to the pinion and frictionally isolated therefrom. In one mode, the present invention is a fishing reel comprising a reel body having a support block, a main shaft, a tubular pinion journalled in the reel body, wherein the inner diameter of the tubular pinion is larger than the diameter of the through-extending main shaft, a rotor nut having bearing means attached thereto, wherein the rotor nut engages the tubular pinion, and wherein the main shaft slidably journals into the bearing means of the rotor nut such that the main shaft is in axial alignment and is in reduced frictional contact with said pinion. In preferred embodiments, the bearing means of the present invention can be a standard ball bearing or a low-friction bushing.

In another mode, the present invention is a fishing reel comprising a reel body having a support block, a main shaft, a tubular pinion journalled into the reel body, wherein the inner diameter of the tubular pinion is larger than the diameter of the through-extending main shaft, a rotor, a rotor nut attaching the rotor to the tubular pinion, and, a rotor nut retainer engaging the perimeter of the rotor nut and attached to the rotor, wherein the rotor nut retainer has bearing means, wherein the main shaft slidably journals into the bearing means of the rotor nut retainer such that the main shaft is in axial alignment and is in reduced frictional contact with the pinion. In preferred embodiments, the rotor nut retainer includes a support tube extending therefrom into which a ball bearing is journalled. In more preferred embodiments, the support tube is formed to have an annular lip for retaining the ball bearing in the support tube.

In yet another mode, the present invention is a fishing reel comprising a reel body having a support block, a main shaft, a tubular pinion journalled into the reel body, wherein the tubular pinion has a cavity having a first region of a first diameter and a second region of a second diameter, wherein the first diameter is larger than said second diameter, wherein the main shaft extends through the tubular pinion in the cavity, wherein the second diameter of the second region is sized such that the through-extending main shaft slidably journals into the second region of the cavity, whereby the main shaft is in axial alignment and is in reduced frictional contact with the first region of the tubular pinion.

As the present invention requires only simple modification and/or replacement of certain conventional fishing reel components, the above-described modes of practicing the present invention apply to most, if not all, conventional fishing reels. For example, the present invention may be used on fishing reels having a variety of different oscillation mechanisms. In one specific embodiment, for example, a fishing reel according to the present invention may comprise a reel body having a keyed bushing and a support block, a main gear journalled into the reel body, a main shaft, the first end of the main shaft having a keyed surface corresponding to the keyed bushing of the reel body such that the main shaft is rotationally but not slidably fixed in the keyed bushing. The main shaft further has a lead screw track defined thereon. The fishing reel further includes a tubular pinion journalled in the reel body and in constant engagement with the main gear, a rotor, a rotor nut securing the rotor to the tubular pinion. The rotor nut further has a support tube extending therefrom with ball bearing means journalled therein. A rotor nut cover threadably engages the support tube to retain the ball bearing in the support tube. Still further, a spool attaches to the second end of the main shaft to oscillate therewith. The tubular pinion has a hole extending therethrough having a diameter that is larger than the diameter of the main shaft. The main shaft extends through the tubular pinion and slidably journals into the bearing of the rotor nut such that the main shaft is in axial alignment and is in reduced frictional contact with the tubular pinion. The tubular pinion further has a pawl in constant engagement in the lead screw track of the main shaft, wherein the lead screw track is defined such that the main shaft oscillates longitudinally and slides within the bushing of said reel housing and the bearing means of the rotor nut, as the pawl rotates about the main shaft and in the lead screw track.

OBJECTS OF THE INVENTION

It is an object of the present invention to improve the efficiency of fishing reels, and to make it easier for fishermen to retrieve line.

It is another object of the present invention to reduce the friction between the rotating pinion and the main shaft oscillating therein.

Another object of the present invention is to provide main shaft support mechanism that holds the main shaft concentric to the pinion.

It is a further object of the invention to frictionally isolate the main shaft from the pinion.

It is yet another object of the present invention to provide a pinion/main shaft isolation mechanism that is simple, low cost, and easy to assemble.

It is a further object of the invention to provide a pinion/main shaft isolation mechanism that can be used with most conventional reel mechanisms, including reels designed with conventional right/left handle operation.

An even further object of the present invention is to provide a main shaft/pinion isolation mechanism that can be applied to existing fishing reels with only a simple retrofit.

BRIEF DESCRIPTION OF THE DRAWINGS

In the drawings.

The same reference numbers refer to the same parts throughout the various Figures.

DESCRIPTION OF A FIRST PREFERRED EMBODIMENT

Figure 1:
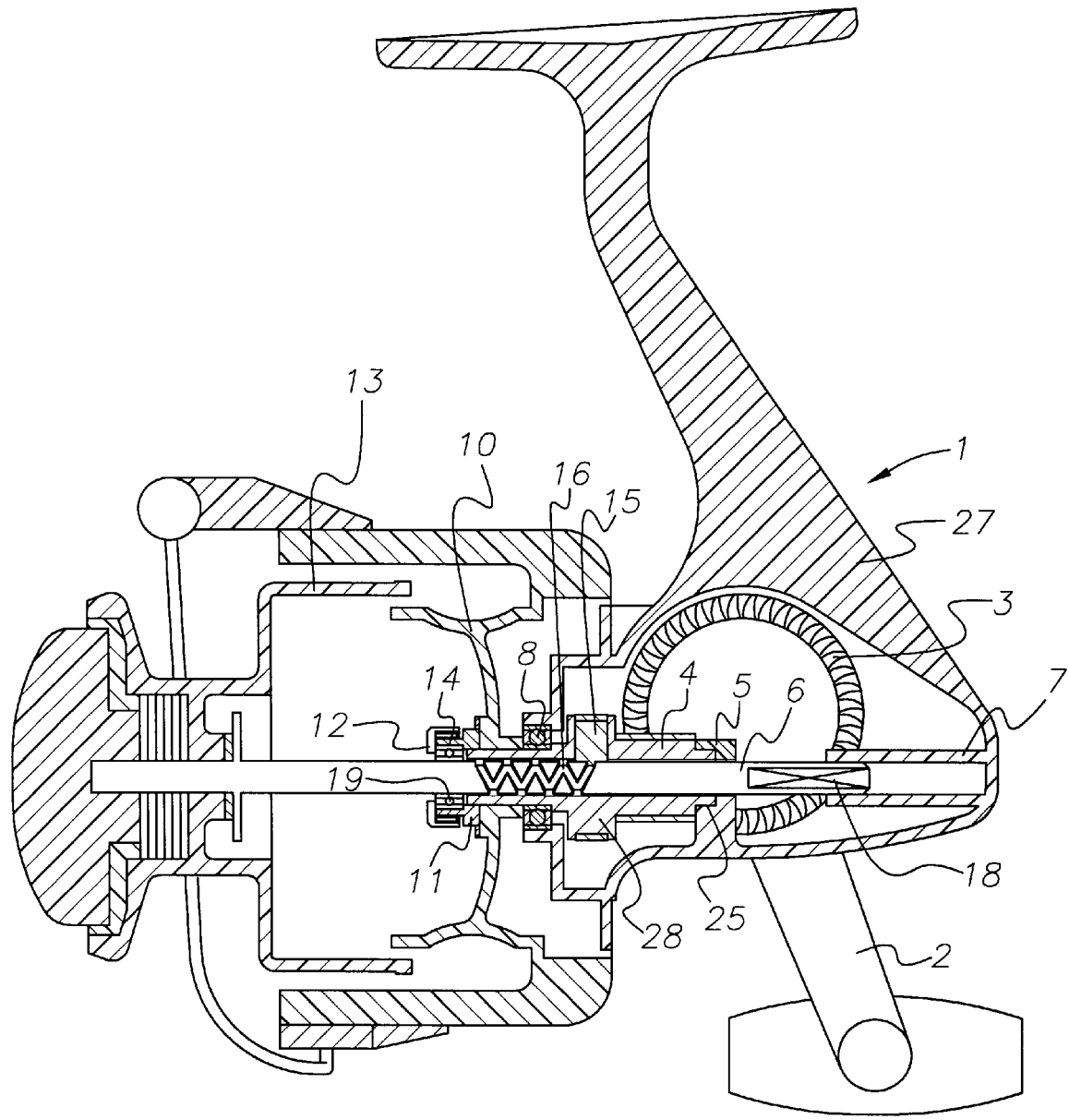
FIG. 1 is a cutaway view of a fishing reel showing an oscillating mechanism and the various components of a first preferred embodiment of the present invention.
Figure 2:
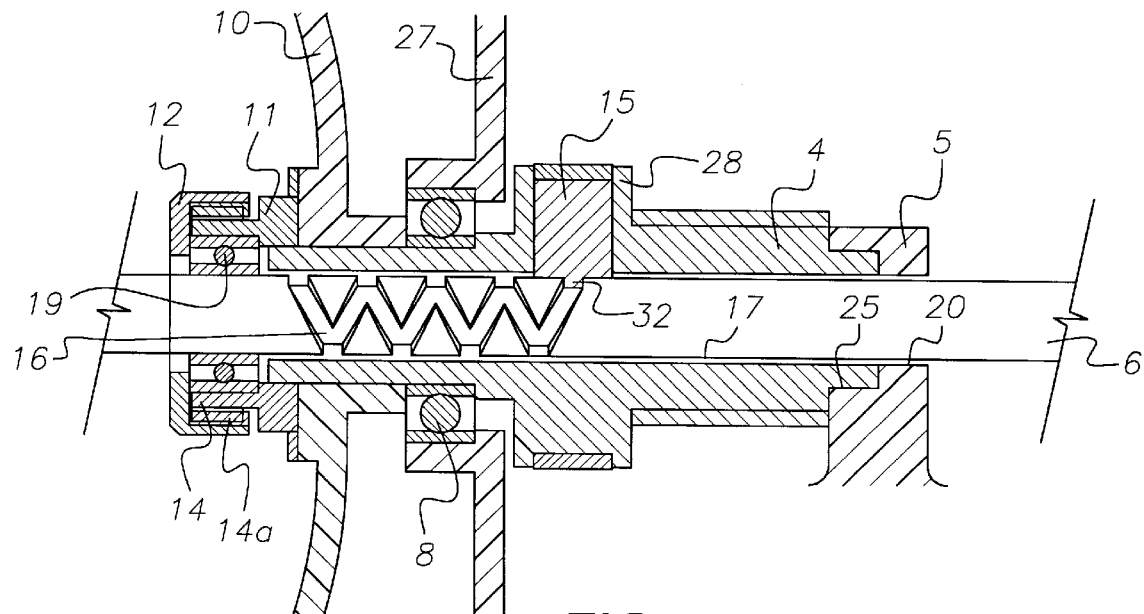
FIG. 2 is an enlarged sectional view of the first preferred embodiment of the isolation mechanism of the present invention.

Referring to FIGS. 1 and 2, a fishing reel incorporating an improved main shaft support mechanism is shown and designated by the number 1. Main gear 3 journals into main reel body 27. Main gear 3 is fixed to and rotated by handle assembly 2.

Support block 5 is integrally formed with main reel body 27. Pinion 4 engages main gear 3 and journals with ball bearing member 8 into main reel body 27 and with support block 5 of main reel body 27 at low friction contact area 25. (See FIG. 2.) Rotor nut 11 fixes pinion 4 to rotor 10. When handle 2 is cranked, rotor 10 rotates in a conventional manner through the gear engagement between main gear 3 and pinion 4.

Fishing reel 1 also includes a main shaft oscillation mechanism. More specifically, pinion 4 is formed with collar 28 to support pawl 15 that slidably engages lead screw track 16 of main shaft 6 at contact area 32. (See FIG. 2.) Collar 28, pawl 15 and lead screw track 16 together form an oscillation mechanism for spool 13 coupled to the distal end of main shaft 6. Specifically, as handle 2 is cranked, main gear 3 turns pinion 4, pawl 15 and rotor 10 as a single unit. As pawl 15 rotates around main shaft 6 and rides within lead screw track 16, main shaft 6 oscillates in the axial direction in a conventional manner.

Rotor nut 11 fixes rotor 10 to pinion 4 in a conventional manner. Rotor nut 11 is further formed to include support tube 14. First support bearing member 19 journals into support tube 14 as shown in FIGS. 1 and 2. Support tube 14 further has threaded outer surface 14a. (See FIG. 2.) Nut cover 12 engages threaded surface 14a and holds first support bearing member 19 in support tube 14. In the first preferred embodiment, first support bearing member 19 is a conventional ball bearing. In other embodiments, first support bearing member 19 could comprise a simple bushing. The inside diameter bore of pinion 4 is larger than the outside diameter of main shaft 6 to form a space 17 therebetween. The inside diameter of first support bearing member 19 is sized to fit closely to main shaft 6, but with sufficient tolerance to allow main shaft 6 to oscillate axially therein.

Main reel body 27 further has bushing 7 integrally formed therewith. Bushing 7 engages main shaft 6 slidably at keyed portion 18 of main shaft 6. Bushing 7 allows main shaft 6 to oscillate axially, but not rotationally, therein.

Support tube 14 of rotor nut 11 and first support bearing member 19 cooperate with bushing 7 of fishing reel body 27 to hold main shaft 6 in concentric axial alignment with pinion 4 and separated therefrom by space 17.

In this manner, main shaft 6 is in reduced frictional contact with pinion 4 to achieve a more efficient fishing reel. From the above description, it can be seen that the pinion 4 and main shaft 6 are held in concentric axial alignment in reduced frictional contact therebetween. The improvement described is simple, low cost, and easy to manufacture.

Specifically, main shaft 6 oscillates with increased frictional independence of pinion 4 within first support bearing member 19 and bushing 7 of fishing reel body 27. Pinion 4 rotates frictionally independent of the main shaft 6 within ball bearing member 8 journalled into fishing reel body 27 and within low friction area 25 of support block 5. Therefore, the friction associated with conventional pinion and main shaft configurations does not develop.

Figure 3:
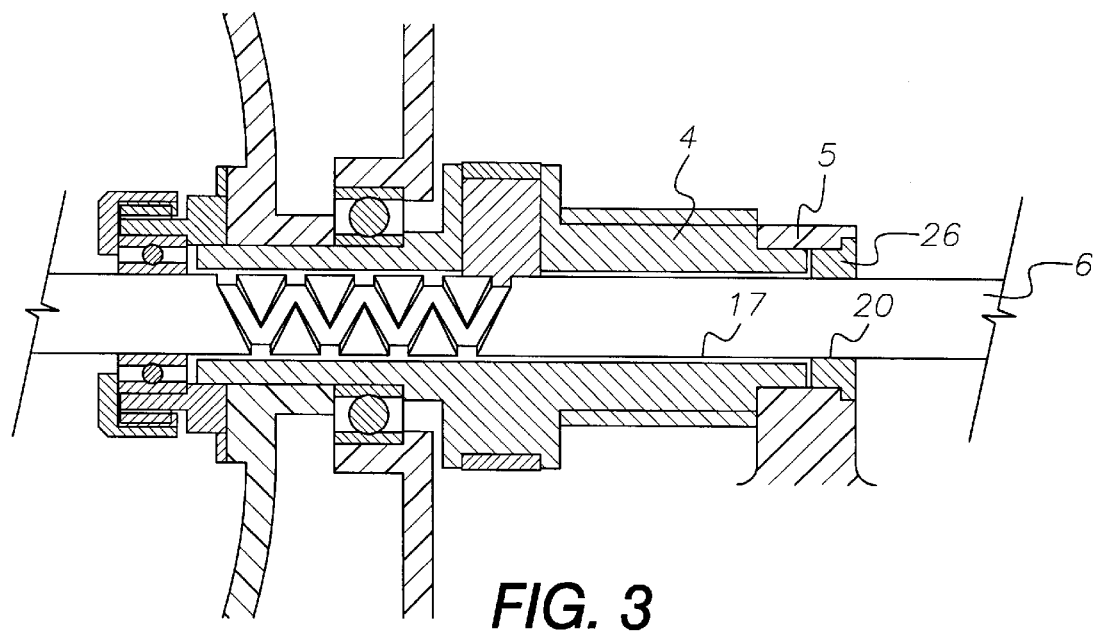
FIG. 3 is an enlarged sectional view of the first preferred embodiment of the present invention further including a bushing in the support block of the reel body.

Furthermore, FIG. 3 shows second support bearing member 26 in support block 5. In this configuration, support block 5 and second support bearing member 26 support main shaft 6 at low friction area 20 and hold main shaft 6 in concentric axial alignment with pinion 4 and separated from said pinion 4 by space 17. Second support bearing member 26 is formed so that low friction area 20 suitably holds main shaft 6, but with enough tolerance to allow axial oscillation of main shaft 6 therein.

Furthermore, the pinion and main shaft configurations, locations and support in the fishing reel of this disclosure is conventional. It is therefore possible to easily modify and improve many existing reels, regardless of the particular oscillation system employed, to take advantage of the present invention. In an existing reel, the conventional pinion can be modified or replaced with a pinion bored to a relatively larger inside diameter from the original to provide the requisite space between the pinion and the main shaft. Replacing the conventional rotor nut with the rotor nut described in this invention permits the insertion of first support bearing member 19 to support the existing main shaft in concentric, axial and non-frictional alignment with the new pinion.

Figure 4:
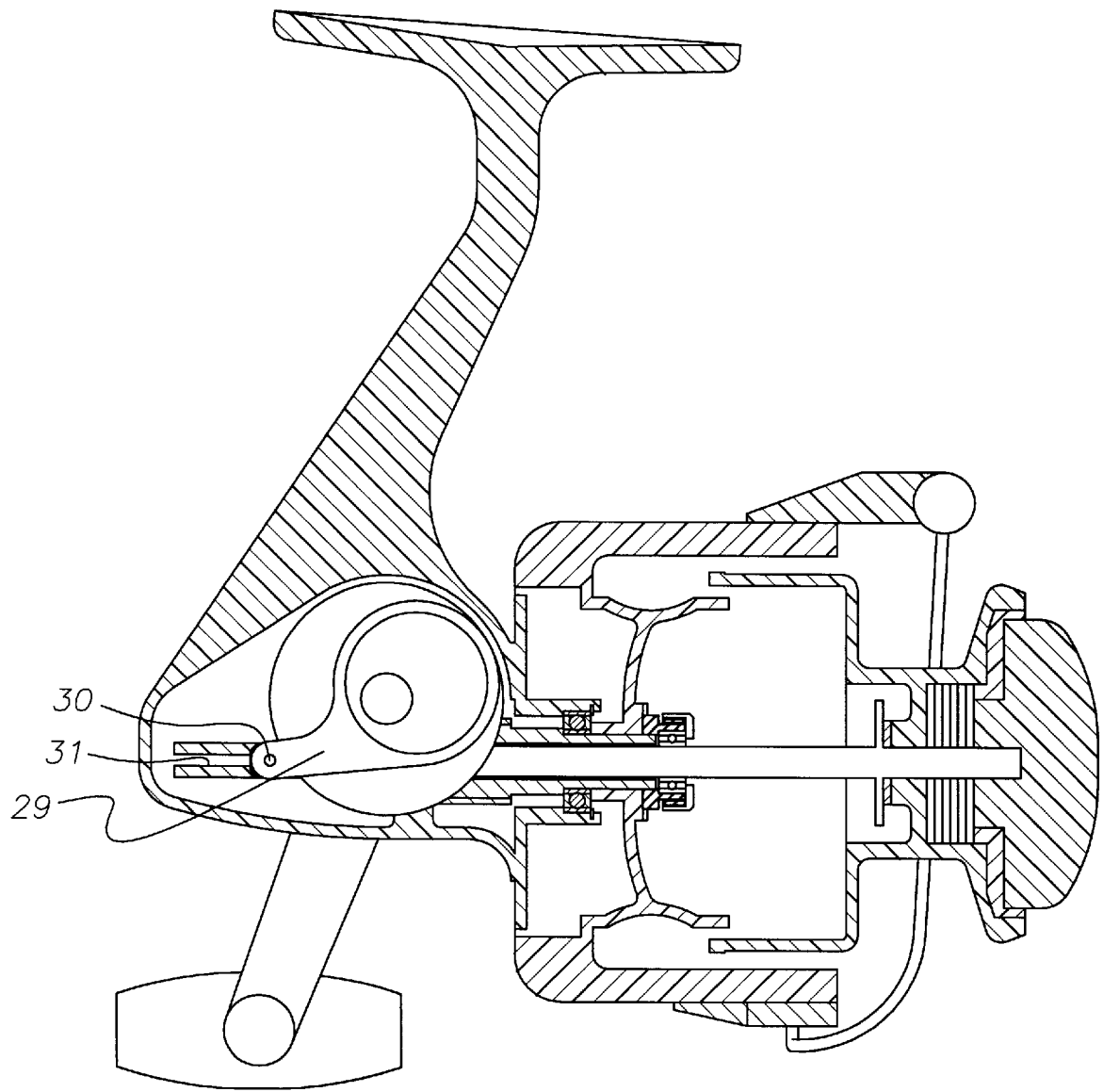
FIG. 4 is a cutaway view of a fishing reel using an existing locomotive oscillation system retrofitted with the first preferred embodiment of the present invention.

FIG. 4 shows a cutaway view of a fishing reel using a conventional locomotive oscillation system, comprised of arm 29 and oscillation pin 30, journalled to alignment track 31. Further, FIG. 4 shows the conventional reel using a conventional locomotive oscillation system retrofitted with the first preferred embodiment of the present invention. Other than the conventional locomotive oscillation system, all other features of the main shaft support system are the same as previously described.

DESCRIPTION OF A SECOND PREFERRED EMBODIMENT

Figure 5:
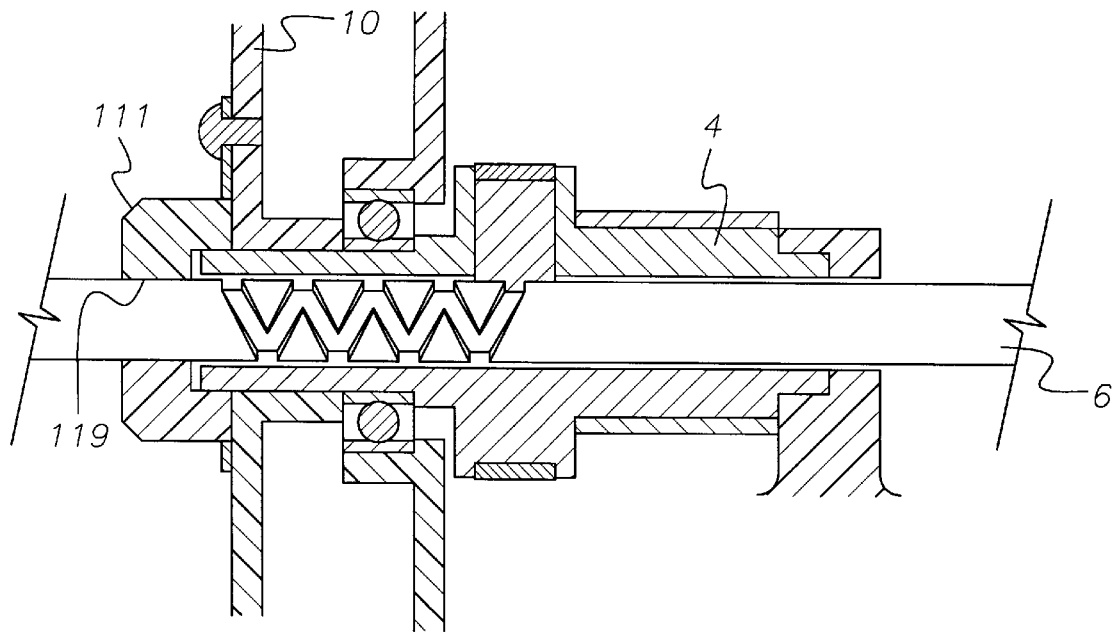
FIG. 5 is an enlarged sectional view of a second preferred embodiment of the isolation mechanism of the present invention that employs rotor nut having an integral bushing.

Referring to FIG. 5, the second preferred embodiment features a rotor nut having a bearing surface integral therewith in lieu of the ball bearing configuration of the first preferred embodiment. More specifically, FIG. 5 shows rotor nut 111 having integral bearing surface 119. Rotor nut 111 attaches rotor 10 to pinion 4 in a conventional manner. Similar to the first preferred embodiment, main shaft 6 is then held in axial alignment with pinion 4 by rotor nut 111 and the keyed bushing (not shown) of the reel body. Otherwise, the second preferred embodiment is substantially identical to the first preferred embodiment.

DESCRIPTION OF A THIRD PREFERRED EMBODIMENT

Figure 6:
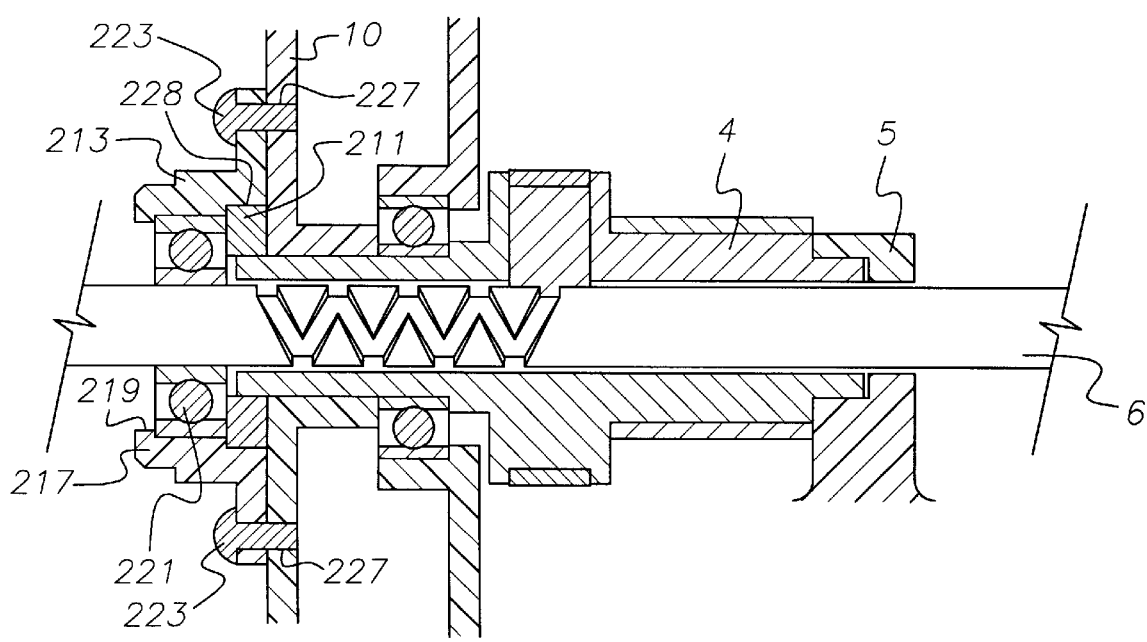
FIG. 6 is an enlarged sectional view of a third preferred embodiment of the present invention.

FIG. 6 illustrates a third preferred embodiment of the present invention where a conventional rotor nut retainer plate has been adapted to hold a ball bearing. As with the first preferred embodiment, the ball bearing holds the main shaft frictionally isolated from the pinion 4. More specifically, FIG. 6 shows a standard hexagonal rotor nut 211 securing rotor 10 to pinion 4. Retainer plate 213 has a hexagonal recess (not shown) corresponding to the perimeter of rotor nut 211 and recess 228. Retainer plate 213 is further formed to include bearing support tube 217 having lip 219 which holds ball bearing 221. Hexagonal recess 228 (not shown) of retainer plate 213 engages rotor nut 211. Screws 223 engage recess 228 of retainer plate 213 and threadably engage threaded holes 227 in rotor 10 to secure retainer plate 213 in place. In this configuration, main shaft 6 extends through pinion 4 and is held in axial alignment by ball bearing 221 and bushing 7 in main body 27. Otherwise, the third preferred embodiment is substantially the same as the first preferred embodiment.

DESCRIPTION OF A FOURTH PREFERRED EMBODIMENT

Figure 7:
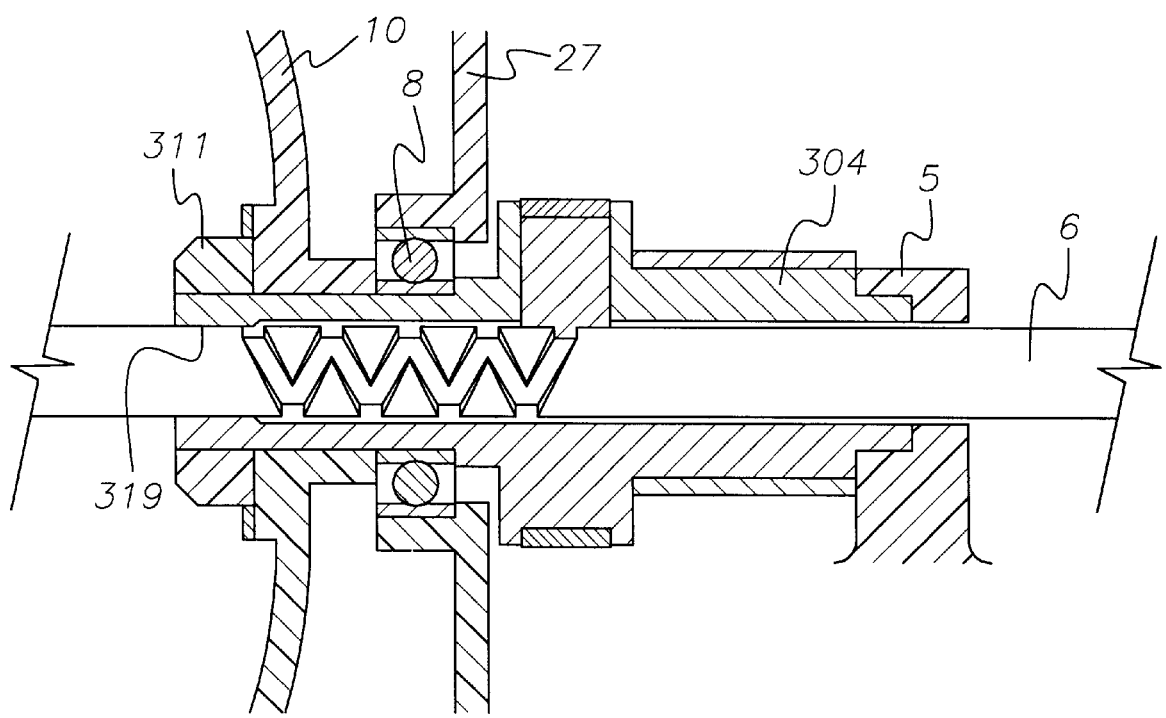
FIG. 7 is an enlarged sectional view of a fourth preferred embodiment of the present invention.

FIG. 7 illustrates a fourth preferred embodiment featuring a pinion having a bushing surface formed therein. More specifically, pinion 304 has bearing surface 319 at a forward region thereof which slidably engages main shaft 6. The remaining portion of the pinion cavity has a diameter larger than that of main shaft 6. Pinion 304 also journals fishing reel body 27 at bushing 7 (not shown) and ball bearing member 8, as previously described. A conventional rotor nut 311 secures rotor 10 to pinion 304. Main shaft 6 extends through pinion 304, as shown in FIG. 6, and is held in axial alignment by bushing surface 319 and bushing 7 (not shown).

As discussed, it is possible to easily modify and improve many existing reels, regardless of the particular oscillation system employed, to take advantage of the present invention. The fourth preferred embodiment of the present invention may be used to retrofit most conventional fishing reel oscillation system. To accomplish the retrofit, the pinion of a conventional oscillation system is replaced with a pinion of the fourth embodiment of the present invention.

SUMMARY

With respect to the above description then, the optimum dimensional relationships for the parts of the invention, to include variations in size, materials, shape, form, function and the manner of operation, assembly and use, are readily apparent and obvious to one skilled in the art. Accordingly, all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, the invention is not limited to the exact construction and operation shown and described. Therefore, all suitable modifications and equivalents which may be resorted to fall within the scope of the invention.

I claim:

1. A fishing reel comprising:
   a reel body having a support block,
   a main shaft,
   a tubular pinion journalled in said support block of said reel body and at a second location in said reel body,
      said tubular pinion having a hole extending therethrough at the axis thereof and having a diameter that is larger than the diameter of said main shaft,
   a rotor,
   a rotor nut,
      said rotor nut attaching said rotor to said tubular pinion,
      said rotor nut having first bearing means attached thereto,
      wherein said rotor nut engages said tubular pinion,
   wherein said main shaft extends through said tubular pinion in said hole and slidably journals into said bearing means of said rotor nut such that said main shaft is in axial alignment and reduced frictional contact with said pinion.

2. The fishing reel of claim 1 wherein said rotor nut includes a support tube, and wherein said bearing means is a ball bearing journalled in said support tube.

3. The fishing reel of claim 2 further including a rotor nut cover attached to said support tube and retaining said ball bearing in said support tube.

4. The fishing reel of claim 1 wherein said bearing means of said rotor nut comprises a bushing surface.

5. The fishing reel of claim 4 wherein said bushing surface is integral to said rotor nut.

6. The fishing reel of claim 1 wherein said main shaft slidably journals into said support block of said reel body.

7. The fishing reel of claim 1 further including a second bearing means secured into said support block of said reel body, wherein said main shaft extends through and slidably journals with said second bearing means.

8. A fishing reel comprising:
   a reel body,
      said reel body having a main gear journalled therein
      said reel body having a support block,
   a main shaft,
   a tubular pinion,
      said tubular pinion journalled in said support block of said reel body at a first location and in constant engagement with said main gear,
      said tubular pinion journalled in said reel body at a second location,
      said tubular pinion having a hole extending therethrough at the axis thereof and having a diameter that is larger than the diameter of said main shaft,
   a rotor,
   a rotor nut attaching said rotor to said tubular pinion,
      said rotor nut having bearing means,
   wherein said main shaft extends through said tubular pinion in said hole and slidably journals into said bearing means of said rotor nut such that said main shaft is in axial alignment and reduced frictional contact with said pinion, and
      oscillation means, said oscillation means operably coupled to said main shaft such that said main shaft oscillates axially within said bearing means of said rotor nut, said main shaft does not rotate when said main gear of said reel body is cranked.

9. The fishing reel of claim 8 wherein said rotor nut includes a support tube, and wherein said bearing means is a ball bearing journalled in said support tube.

10. The fishing reel of claim 9 further including a rotor nut cover attached to said support tube and retaining said ball bearing in said support tube.

11. The fishing reel of claim 8 wherein said bearing means of said rotor nut comprises a bushing surface.

12. The fishing reel of claim 11 wherein said bushing surface is integral with said rotor nut.

13. The fishing reel of claim 8 further including a second bearing member secured into said support block of said reel body, wherein said main shaft extends through and slidably journals with said second bearing member.

14. A fishing reel comprising:
   a reel body,
      said reel body having a bushing,
      said reel body having a main gear journalled therein,
      said reel body further having a support block,
   a main shaft,
      said main shaft having a first end and a second end,
      said main shaft rotationally, but not slidably fixed at said first end in said bushing of said reel body,
   a tubular pinion,
      said tubular pinion journalled in said support block of said reel body at a first location and in constant engagement with said main gear,
      said tubular pinion journalled in said reel body at a second location,
      said tubular pinion having a hole extending therethrough at the axis thereof,
      said hole having a diameter that is larger than the diameter of said main shaft,
   a rotor,
   a rotor nut securing said rotor to said tubular pinion,
      said rotor nut having bearing means,
   wherein said main shaft extends through said hole of said tubular pinion and is journalled into said bearing means of said rotor nut such that said main shaft is in axial alignment and reduced frictional contact with said tubular pinion.

15. The fishing reel of claim 14 further including oscillation means, said oscillation means operably coupled to said main shaft such that said main shaft oscillates in the axial direction within said bearing means of said rotor nut and said bushing of said reel body, when said main gear of said reel body is cranked.

16. A fishing reel comprising:
   a reel body,
      said reel body having a keyed bushing,
      said reel body having a main gear journalled therein,
      said reel body having a support block,
   a main shaft,
      said main shaft having a first end and a second end,
      said first end of said main shaft having a keyed surface corresponding to said keyed bushing of said reel body;
      said main shaft rotationally but not slidably fixed at said first end in said keyed bushing of said reel body,
      said main shaft having a lead screw track thereon,
   a tubular pinion,
      said tubular pinion journalled in said support block of said reel body at a first location and in constant engagement with said main gear,
      said tubular pinion journalled in said reel body at a second location,
   a rotor,
   a rotor nut securing said rotor to said tubular pinion,
      said rotor nut having a support tube extending therefrom along the axis thereof,
   a ball bearing journalled into said support tube of said rotor nut,
   a rotor nut cover threadably engaging said support tube to thereby retain said ball bearing,
   a spool,
      said spool attached to said second end of said main shaft, said tubular pinion having a hole extending therethrough at the axis thereof,
      said hole having a diameter that is larger than the diameter of said main shaft, said main shaft extending through said tubular pinion in said hole and slidably journalled into said ball bearing of said rotor nut such that said main shaft is in axial alignment in reduced frictional contact with said tubular pinion, said tubular pinion having a pawl in constant engagement in said lead screw track of said main shaft,
   said lead screw track defined such that said main shaft oscillates longitudinally and slides within said bushing of said reel housing and said ball bearing of said rotor nut, as said pawl rotates about said main shaft and in said lead screw track.

17. A fishing reel comprising:
   a reel body having a support block,
   a main shaft,
   a tubular pinion journalled in said support block of said reel body at a first location and at a second location in said reel body,
      said tubular pinion having a hole extending therethrough at the axis thereof and having a diameter that is larger than the diameter of said main shaft,
   a rotor,
   a rotor nut attaching said rotor to said tubular pinion,
   and, a rotor nut retainer engaging the perimeter of said rotor nut and attached to said rotor,
      said rotor nut retainer having bearing means,
   wherein said main shaft extends through said tubular pinion in said hole and is slidably journalled into said bearing means of said rotor nut retainer such that said main shaft is in axial alignment and reduced frictional contact with said tubular pinion.

18. The fishing reel of claim 17 wherein said rotor nut retainer includes a support tube extending therefrom, and wherein said bearing means is a ball bearing journalled in said support tube.

19. The fishing reel of claim 18 further wherein said support tube is formed to have a lip at the distal end thereof for retaining said ball bearing in said support tube.

20. The fishing reel of claim 17 wherein said bearing means of said rotor nut retainer comprises a bushing surface.

21. The fishing reel of claim 20 wherein said bushing surface is integral with said rotor nut retainer.

22. A fishing reel comprising:
   a reel body having a support block,
   a main shaft,
   a tubular pinion journalled in said support block of said reel body at a first location and at a second location in said reel body,
      said tubular pinion having a cavity extending therethrough at the axis thereof; said cavity having a first region of a first diameter and a second region of a second diameter; said first diameter being larger than said second diameter;

wherein said main shaft extends through said tubular pinion in said cavity; said second diameter of said second region sized such that said through-extending main shaft slidably journals into said second region of said cavity; whereby said main shaft is in axial alignment and is in reduced frictional contact with said first region of said tubular pinion.

23. The fishing reel of claim 22 further including a rotor, and a rotor nut securing said rotor to said tubular pinion.

* * * * *